(12) United States Patent
Andujar

(10) Patent No.: US 8,587,145 B2
(45) Date of Patent: Nov. 19, 2013

(54) VERTICAL AXIS HYDRO KINETIC WIND TURBINE

(76) Inventor: Juan Andujar, San Juan, PR (US)

( * ) Notice: Subject to any disclaimer, the term of this patent is extended or adjusted under 35 U.S.C. 154(b) by 406 days.

(21) Appl. No.: 12/903,350

(22) Filed: Oct. 13, 2010

(65) Prior Publication Data

US 2011/0084494 A1  Apr. 14, 2011

Related U.S. Application Data

(60) Provisional application No. 61/250,982, filed on Oct. 13, 2009.

(51) Int. Cl.
*F03D 3/00* (2006.01)
(52) U.S. Cl.
USPC .................................. 290/55; 290/44; 60/398
(58) Field of Classification Search
USPC ........................... 290/44, 55; 415/2.1; 60/398
See application file for complete search history.

(56) References Cited

U.S. PATENT DOCUMENTS

| | | | |
|---|---|---|---|
| 5,375,968 A | 12/1994 | Kollitz et al. | |
| 6,718,761 B2 * | 4/2004 | Merswolke et al. | 60/398 |
| 6,853,096 B1 | 2/2005 | Yu et al. | |
| 7,183,664 B2 | 2/2007 | McClintic | |
| 7,230,348 B2 * | 6/2007 | Poole | 290/55 |
| 7,239,035 B2 | 7/2007 | Garces et al. | |
| 7,329,965 B2 | 2/2008 | Roberts et al. | |
| 7,462,950 B2 | 12/2008 | Hu | |

FOREIGN PATENT DOCUMENTS

| | | |
|---|---|---|
| CN | 201165941 | 12/2008 |
| CN | 201222689 | 4/2009 |
| CN | 101435411 | 5/2009 |

* cited by examiner

*Primary Examiner* — Vanessa Girardi
(74) *Attorney, Agent, or Firm* — James Ray & Assoc

(57) ABSTRACT

A wind turbine for power generation includes a vertical axis hydro kinetic wind generator with an independent free turning magnetically levitated high powered magnetic translator stack. The wind turbine converts high pressure hydraulic kinetic energy stored in the high pressure reservoir into mechanical energy that drives the vertical axis linear generator. The high pressure reservoir, hydraulic pump motor, microprocessor controller and algorithm software and the fully levitated vertical axis linear generator along with light weight sail blades are instrumental for improved operation.

20 Claims, 4 Drawing Sheets

VERTICAL AXIS HYDRO KINETIC WIND TURBINE

CROSS-REFERENCE TO RELATED APPLICATIONS

This application is related to and claims priority from provisional patent application 61/250,982 filed Oct. 13, 2009 and is herein incorporated by reference.

FIELD OF THE INVENTION

The present invention relates, in general, to wind turbines for power generation and, more particularly, this invention relates to a vertical axis hydro kinetic wind generator with an independent free turning magnetically levitated high powered magnetic translator stack.

SUMMARY OF THE INVENTION

Predicting wind availability where and when and for how long is not yet possible. The strength of the wind is not constant and it varies from zero to storm force. This means that wind turbines do not produce the same amount of electricity all the time, there will be times when they produce no electricity at all.

On the other hand the present invention with its high pressure reservoir and its hydro kinetic turbine used in an vertical axis hydro kinetic wind generator is a key element in the device's economic performance and is considered by wind energy experts as a significant leap to commercialization leapfrogging the traditional wind turbine.

The present invention is an anywhere anytime vertical axis hydro kinetic wind generating solution with distinct advantages over conventional horizontal and vertical wind turbines with low cost global deployment better operational performance and greater environmental advantages.

The turbine converts high pressure hydraulic kinetic energy stored in the high pressure reservoir into mechanical energy that drives a vertical axis linear generator with an independent free turning high powered magnetic translator stack. The high pressure reservoir, hydraulic pump motor, microprocessor controller and algorithm software and the fully levitated vertical axis linear generator along with a light weight Savonius, Darrieus, squirrel cage type, sail blades or other wind harnessing blades made of carbon fiber, polyethylene, polypropylene, fiberglass, or aluminum are instrumental for the improved operation of the present invention.

Wind blades are mechanically attached to the stator windings outer body shell. The wind forces on the outer body shell and internal winding stator act to rotate clockwise generating instant 240 volt AC, 3 phase power depending on the kw size generator while the magnet stack is static until it's required to rotate in the opposite direction powered by the high pressure hydraulic fluid that will force the kinetic energy turbine wheel to turn via the hydraulic pressurized fluid discharged through the each high pressure jets, preferably four high pressure jets, controlled by software so as the wind speeds decrease the magnet stack increases rpm speed which takes up the slack in lost rpm's by rotating faster as the winding stator continues to slow down, to keep rpm's at the equivalent of 20 to 50 mph of wind speed and no higher is controlled by software, higher or lower speeds are dependent on the KW or MW size of the machine.

An innovative feature of the present invention is the ability to match existing known wind conditions to known power requirements that can be programmed into the microprocessor controller and software system self-adjusting to a spectrum of wind conditions trough it's software algorithm, which informs and controls the hydraulic pump motor dynamic & static head, gpm's, the turbine wheel rpm, to load torque ratio requirements, harmonics, and the magnetic stack to winding electromagnetic flux. All generators from 1.5 kw to the larger 1.5 MW units software could also control the hydraulic breaking system to control storm or hurricane wind conditions. Moreover the high pressure reservoir would have stored kinetic energy power back up to keep the turbine turning and generating electricity for 24 hours or until the wind slows down to a safe speed, at which time the wind generation will continue its normal wind generation.

Another innovative feature is the software system would allow the consumer to call the manufacture or distributer customer service center at which point they would be asked to press a series of button on the wall mounted monitoring screen in their living room which would indicate the units' difficulties. This triggers a series of diagnostic tones corresponding to a specific maintenance need that can be identified by a service technician over the phone. For those instances when the problem can't be resolved over the phone, the system would allow the problem to be identified and the field technician would be able to come prepared with the correct parts, materials and personnel so the repair can be carried out in one visit.

The kinetic back up system works by compressing and displacing water or hydraulic fluid by means of a high pressure hydraulic pump controlled by a proprietary software algorithm which is preferably housed beneath the high pressure reservoir tank. The high pressure pump is activated by its first electrical generating cycle as the wind turns the wind blades with power generation in as low as 4 mph of wind to run a 20 KW generator. Within 20 minutes the high pressure reservoir will be full again and ready to run for 12 hours depending on the size of the reservoir repeating the filling cycle every 3 hours while maintaining dynamic and static pressure as it continues to run producing 5, 10, 20 or 1 MW of non-intermittent power until the wind comes back at which time the software will stop or slow down the hydraulic pump, turbine and magnet stack allowing the wind to take over, permitting the turbine, hydraulic pump and fluids are at rest, thus extending the service life cycle of the high pressure hydraulic turbine kinetic backup system. Two additional but very important attributes of the unit: (A.) The system has the ability to pre-charge the high pressure reservoir tank at the factory or at the distributer for when it is delivered to the end user, so when the unit is installed and there is no wind blowing at the time of commissioning the unit, by just simply pressing the start button the unit will start generating electric power for 24 hours or until the wind comes back. Even when the unit is stopped for maintenance the high pressure reservoir will always be ready to start the magnetic, hydro kinetic backup system. (B.) The ability to change from an external vertical axis linear generator to an internal axis generator, were the generator sheds its wind blade housing (11) and it's no longer used on top of the hydraulic fluid reservoir tank (30), turbine and turbine injector housing (28) and (29) and the turbine shaft (16) is now inverted upwards. Therefore allowing the unit to be employed in many applications such as: mega yacht, sailing vessels, naval ships, high raise buildings and many others.

Pipe diameter is very important within the reservoir piping. For example, a typical pipeline will cause the water flowing within them to lose some energy due to friction. The pipe must be large enough for the maximum volume of fluid or water it will carry the current invention however, has no loss of energy due to pipeline friction. The pressurized pipe is located within the pressurized reservoir, and because the distance from the reservoir to the out flow jet nozzle maybe only 1 to 3 feet and the available dynamic head from the hydraulic pump and reservoir could put out approximately 1000 to 5000 ft of head×3,000 gpm of outlet flow, thus maintaining static pressure and running head within the reservoir and pipe at all times, acquiring a high mechanical power output rpm to shaft torque to generator load ratio, although the end result is a lower electrical output from the generator which is expected however the electrical output service is reliable, constant and abundant.

The system provides a software control solenoid gate valve on the pipeline just before the turbine housing along with a pressure gauge on a "T" fitting just above the gate valve to read the static pressure on the gauge when the valve is closed and the dynamic pressure when the gate valve is opened.

The maximum power that can be delivered by the internal pipe to the turbine will occur when the dynamic pressure is approximately ⅔ of the static pressure. The actual flow rate of the hydraulic fluid in the hydrokinetic system is determined by the diameter of the pelton type turbine & the diameter of the jet nozzle orifice. The turbine size may vary as well as the proper size nozzle and turbine depending on required KW output. The sculptured curvature of the wind blades exposes maximum surface area to the air which means not only can it harness a breeze from any direction it takes less wind to produce substantial power with several types of blades styles. This in turn allows the present invention to be installed at lower heights than other turbines making it safer, simpler and less expensive to install, although it may be mounted on 30, 40, 60 or 80 feet long hydraulic collapsible towers allowing for repairs or a full generator replacement, in under 5 hours, while it takes 2 to 4 weeks to perform the same service to a typical horizontal wind turbine. Larger KW and MW units can be installed at close proximities to each other, as close as 10 feet from each other and 25 units of the current invention with a rating of 1.5 MW each can occupy the foot print area required for one (1) horizontal wind turbine of the same 1.5 MW size can be hidden behind tall trees and other objects for aesthetic reasons. Moreover a conventional/wind turbine will require a 100 ft to 250 ft non-collapsible steel towers.

The wind blades operate silently with their unique contour shape and are completely safe for birds. The present invention functions as an excellent addition to other existing power systems playing an integral part in reducing our dependency in non-renewable fuels. When properly placed and installed this invention can reduce our power consumption from other sources by half or allow for complete independence from the power grid when a larger unit is installed.

The present invention is a robust vertical axis fully magnetically levitated, hydro kinetic, non-intermittent wind generator, different from traditional wind turbines in that their main axis is perpendicular to the ground. Its configuration can employ at lest two different turbine blade shapes and sizes it further employs two different types of kinetic energy back up devices integrated into every unit. Allowing the system to run 24/7, 365 days a year without the need for inverters and batteries. Making them ideal for both rural and urban settings, thus offering the commercial and the residential user an opportunity to neutralize the rising cost of fuel and electricity and preserve the environment.

There are many advantages of the present invention over conventional wind turbines. The present invention requires a minimum of 2 mph wind to start generating because it's magnet stack and winding stater are completely magnetically levitated and dynamically balanced, thus moving free with no severe friction loads & with no stress bearing load. Traditional vertical axis wind turbines typically have substantial friction loads and stress bearing loads on their shaft, magnet stack and winding stater.

Conventional horizontal axis wind turbines are constantly under stress bearing and friction loads. A typical 1 MW wind turbine prop blade weighs approximately 10 to 14 tons transferring severe bending axial shear, stress bearing and friction loads, thus creating severe metallurgy fatigue to the main shaft and bearing, thus transferring severe shock and friction loads to the gearbox and generator especially at higher wind speeds. A re-evaluation and re-engineering of wind turbines has bought about a new breed of wind power generation and advanced technology concepts in renewable kinetic wind linear generator technologies the design of metallurgy and other materials with extreme strength to mass ratios, geared towards the highest degree of reliability and thus has critically reduced overall turbine mass.

The present invention is not affected by the direction of the wind which is useful in areas where the wind changes direction frequently or quickly. Unlike traditional horizontal axis wind turbines no mechanism is needed to turn the wind turbine towards the wind. Because of this the present invention outperforms horizontal axis turbines in areas where a tall tower is not feasible, obstacles are nearby, or the wind is more turbulent. The present invention is ideal for both rural and urban applications including roof top installations. Depending on the roofs shape, wind flow over the roof may even be concentrated leading to an increased energy output.

OBJECTS OF THE INVENTION

It is, therefore, one of the primary objects of the present invention to provide a vertical axis magnetically levitated non-intermittent wind generator.

Another object of the present invention to provide a vertical axis magnetically levitated non-intermittent wind generator with a hydraulic reservoir that makes the need for batteries or an inverter unnecessary for continuous operation.

It is another object of the present invention to provide a vertical axis magnetically levitated non-intermittent wind generator that can be used in low or intermittent wind environments.

In addition to the various objects and advantages of the present invention described with some degree of specificity above it should be obvious that additional objects and advantages of the present invention will become more readily apparent to those persons who are skilled in the relevant art from the following more detailed description of the invention, particularly, when such description is taken in conjunction with the attached drawing figures.

BRIEF DESCRIPTION OF A PRESENTLY PREFERRED AND VARIOUS ALTERNATIVE EMBODIMENTS OF THE INVENTION

Reference is now made, more particularly, to FIGS. 1-4, which show preferred embodiments of the present invention.

Figure 1:
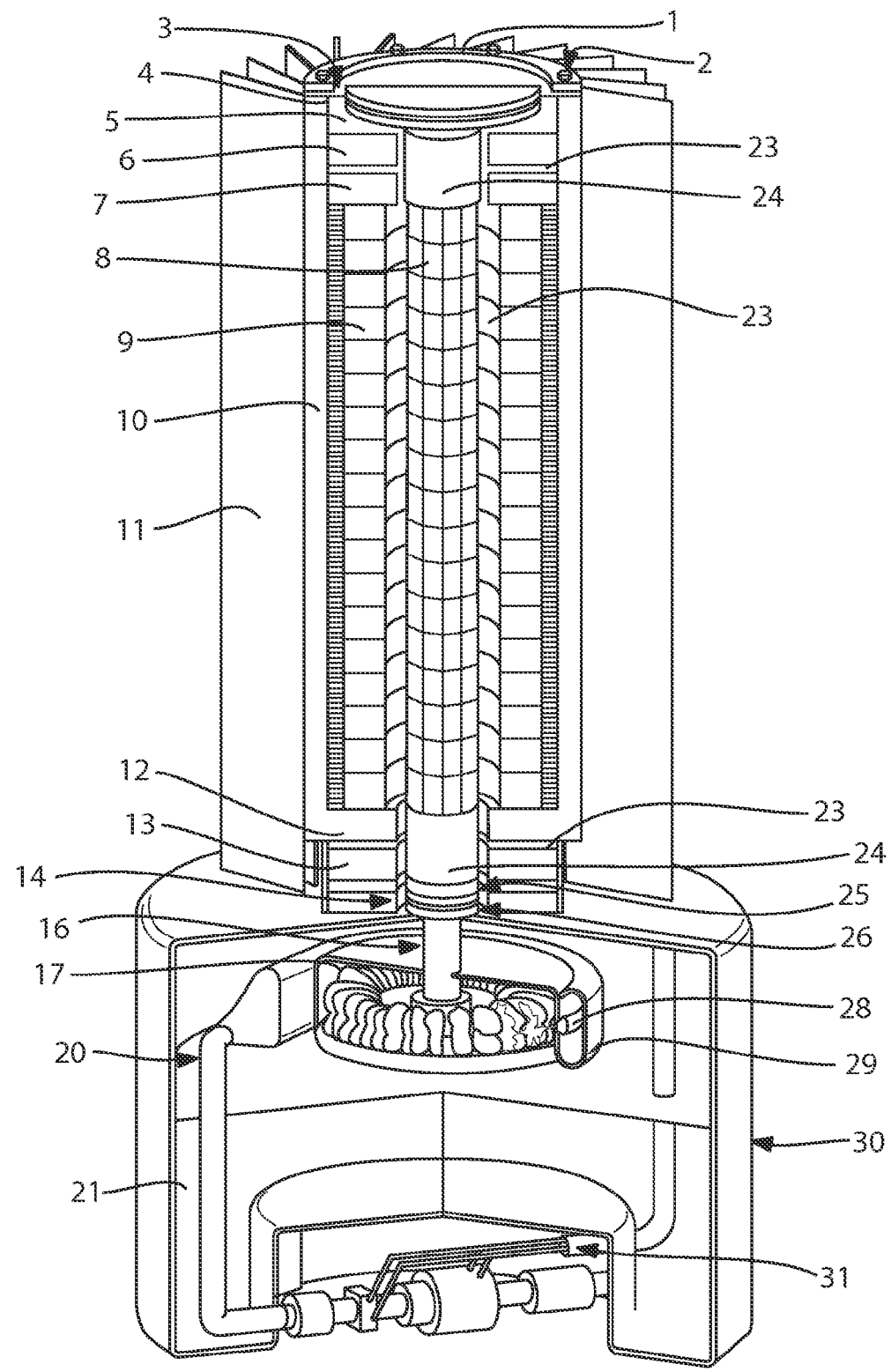
FIG. 1 is a cutaway view of a preferred embodiment of the present invention.

FIG. 1 shows the internal components of a preferred embodiment of the present invention comprising generator cap 1, cap bolt, 2 magnetic disk 3, magnetic levitating disk 4, upper end plastic support 5, magnetic disk bearing plate first upper unit 6, magnetic disk bearing plate first lower unit 7, magnet stack stator 8, copper winding rotor 9, generator housing 10, generator housing blade 11, magnetic disk bearing plate second upper unit 12, magnetic disk bearing plate second lower unit 13, lower end plastic motor support 14, turbine shaft 16, turbine housing 17, turbine hydraulic fluid supply pipe 20, hydraulic fluid 21, air gap 23, magnet shaft bearing slip fit collar 24, motor shaft lower end 25, touch down bearing 26, turbine injector 28, turbine injector housing 29, hydraulic fluid reservoir tank 30 and internal AC conduit 31.

Figure 2:
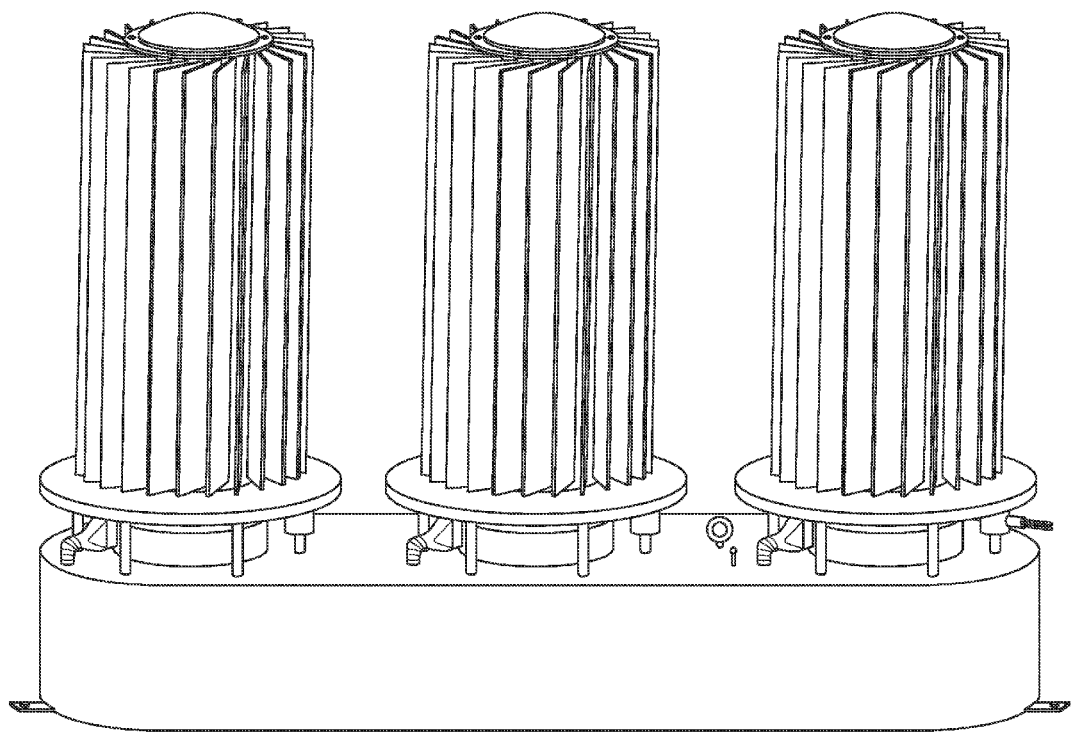
FIG. 2 is a perspective view of a preferred embodiment of the present invention.
Figure 3:
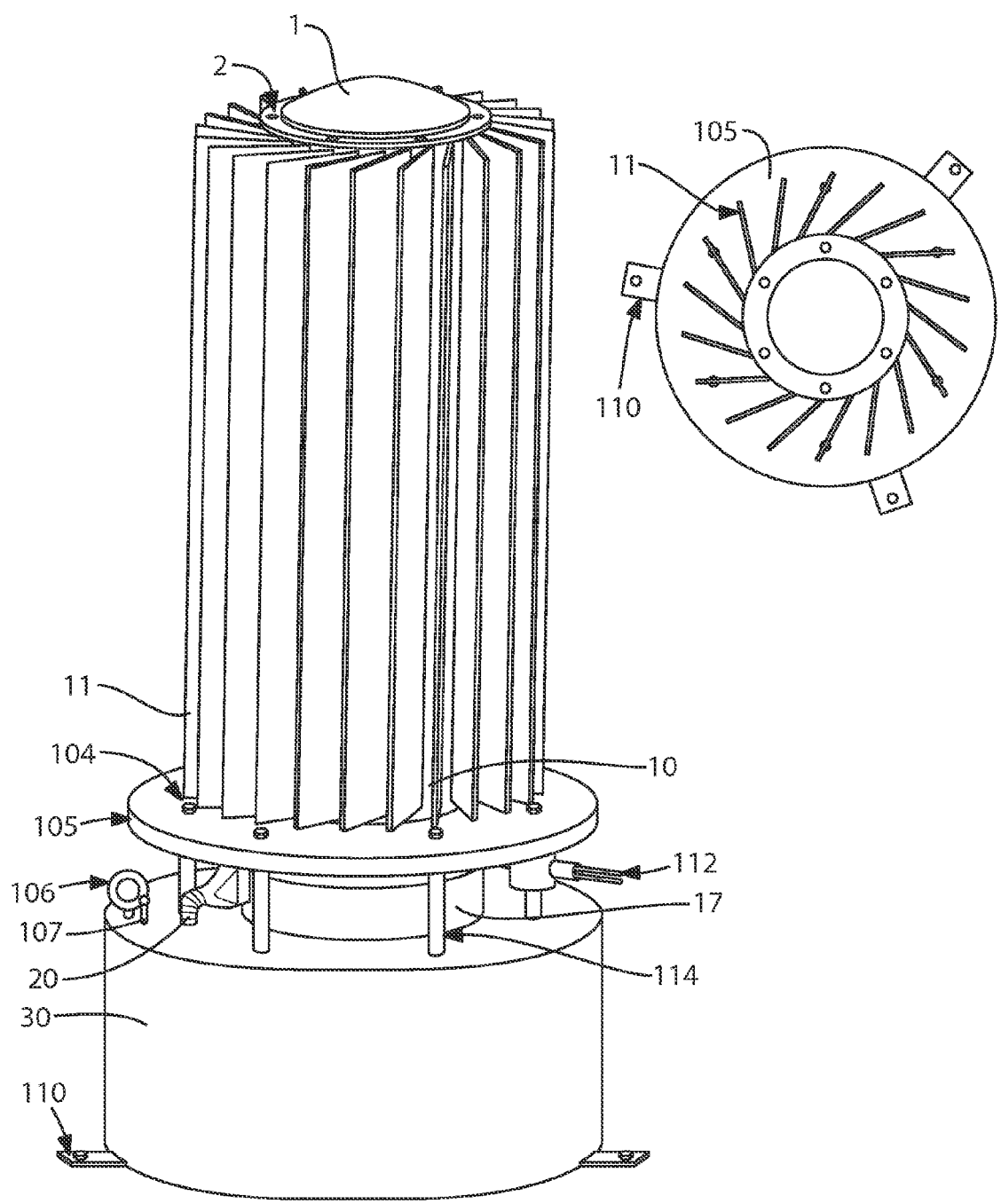
FIG. 3 is a perspective view of a preferred embodiment of the present invention.

FIG. 2 shows an example of a multiple unit assembly. FIG. 3 shows an exterior view of a preferred embodiment comprising generator cap 1, cap bolt 2, aluminum blade 11, base plate bolt 104, generator base plate 105, pressure gauge & electronic oil gauge level 106, pressure relief valve 107, turbine hydraulic fluid supply pipe 20, hydraulic fluid reservoir tank 30, anchoring bracket 110, generator housing 10, AC to house 112, turbine housing 17 and generator body support 114.

Figure 4:
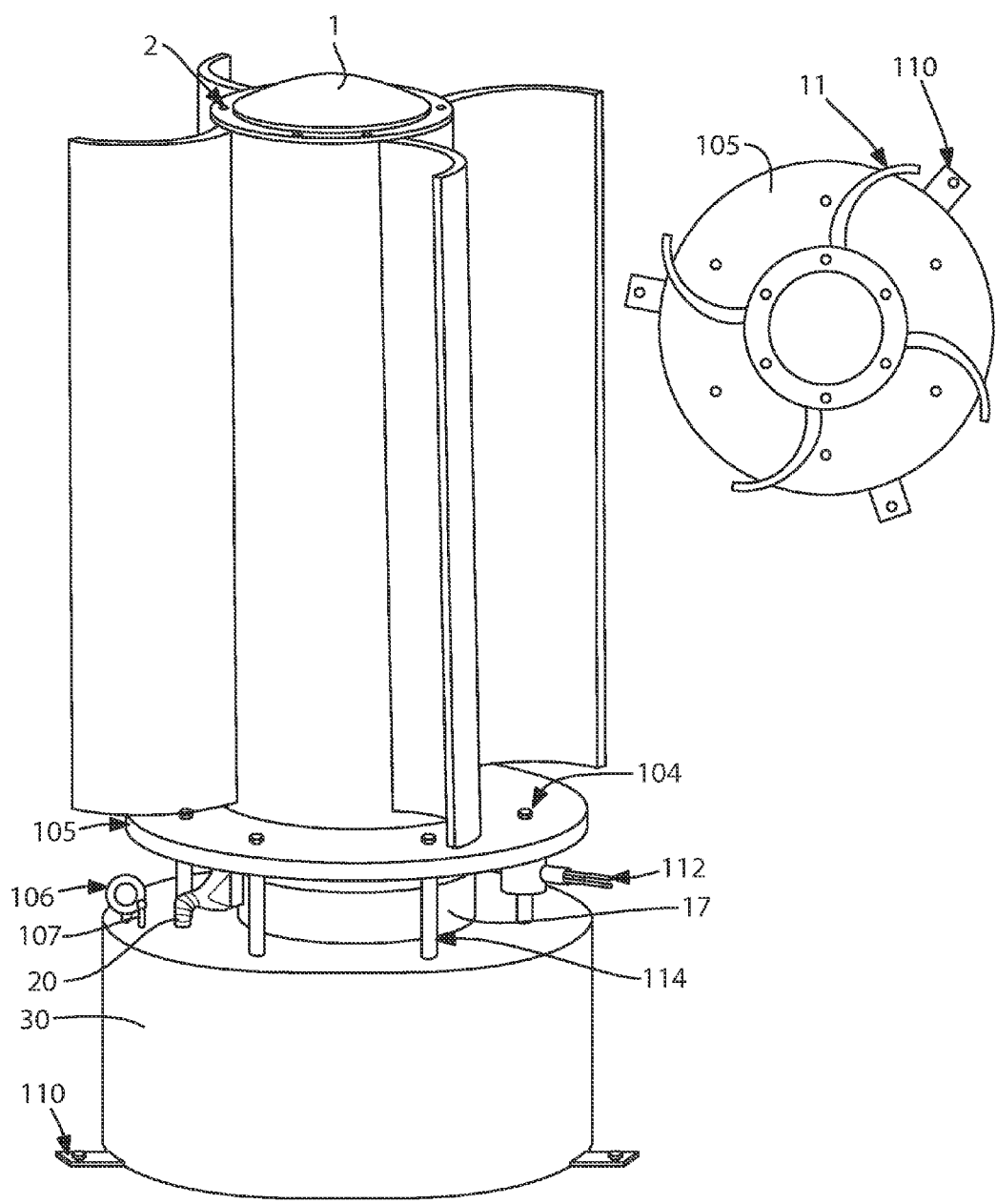
FIG. 4 is a perspective view of a preferred embodiment of the present invention.

FIG. 4 shows an exterior view of a preferred embodiment comprising generator cap 1, cap bolt 2, aluminum blade 11, base plate bolt 104, generator base plate 105, pressure gauge & electronic oil gauge level 106, pressure relief valve 107, turbine hydraulic fluid supply pipe 20, hydraulic fluid reservoir tank 30, anchoring bracket 110, generator housing 10, AC to house 112, turbine housing 17 and generator body support 114.

While a presently preferred and various alternative embodiments of the present invention have been described in sufficient detail above to enable a person skilled in the relevant art to make and use the same it should be obvious that various other adaptations and modifications can be envisioned by those persons skilled in such art without departing from either the spirit of the invention or the scope of the appended claims.

I claim:

1. A vertical axis wind turbine comprising:
   a vertical rotary shaft;
   a plurality of wind turbine blades, mechanically coupled to said vertical rotary shaft;
   a hydraulic energy storage apparatus coupled to said vertical rotary shaft; and
   a free turning magnetically levitated powered magnetic stack stator.

2. A vertical axis wind turbine comprising:
   a vertical rotary shaft;
   a plurality of wind turbine blades, mechanically coupled to said vertical rotary shaft;
   a magnet stack stator and a copper winding rotor disposed inside said plurality of wind turbine blades; and
   a hydraulic energy storage apparatus, coupled to said vertical rotary shaft and disposed underneath said plurality of wind turbine blades.

3. The vertical axis wind turbine of claim 2, wherein said hydraulic energy storage apparatus comprises,
   a hydraulic fluid tank,
   a turbine hydraulic fluid supply pipe, and
   a hydraulic turbine injector.

4. The vertical axis wind turbine of claim 2, wherein said vertical rotary shaft is mechanically coupled to said magnet stack stator.

5. The vertical axis wind turbine of claim 2, wherein said vertical rotary shaft is mechanically coupled to said magnet stack stator, said magnet stack stator being at least partially enclosed by said copper winding rotor.

6. The vertical axis wind turbine of claim 2, wherein said magnetic stack stator is configured as a free turning magnetically levitated powered magnet stack stator.

7. The vertical axis wind turbine of claim 2, wherein said hydraulic energy storage apparatus comprises, a pelton type turbine and a hydraulic jet nozzle.

8. The vertical axis wind turbine of claim 2, further comprising a housing encasing said magnet stack stator and said copper winding rotor and wherein said plurality of wind turbine blades are attached to an exterior surface of said housing.

9. The vertical axis wind turbine of claim 2, further comprising first and second magnetic disk bearing plate units disposed at each end of said magnet stack rotor and said copper winding rotor.

10. The vertical axis wind turbine of claim 9, wherein inner surfaces of first and second magnetic disk bearing plate units are separated from each other by an air gap.

11. The vertical axis wind turbine of claim 9, further comprising a pair of collars, each attached to said vertical rotary shaft in radial alignment with a respective first and second magnetic disk bearing plate units.

12. A wind turbine comprising:
    a vertical rotary shaft;
    a plurality of wind turbine blades, mechanically coupled to said vertical rotary shaft;
    a hydraulic energy storage apparatus, coupled to said vertical rotary shaft;
    wherein said vertical rotary shaft is mechanically coupled to a magnet stack stator, said magnet stack stator being at least partially enclosed by a copper winding rotor.

13. The wind turbine of claim 12, wherein said hydraulic energy storage apparatus comprises,
    a hydraulic fluid tank,
    a turbine hydraulic fluid supply pipe, and
    a hydraulic turbine injector.

14. The wind turbine of claim 12, wherein said hydraulic energy storage apparatus comprises, a pelton type turbine and a hydraulic jet nozzle.

15. The wind turbine of claim 12, wherein said hydraulic energy storage apparatus comprises,
    a hydraulic fluid tank,
    a turbine hydraulic fluid supply pipe,
    a hydraulic turbine injector, and
    a pelton type turbine.

16. The wind turbine of claim 12, further comprising a free turning magnetically levitated powered magnetic stack stator.

17. A vertical axis wind turbine comprising:
    a vertical rotary shaft;
    a plurality of wind turbine blades, mechanically coupled to said vertical rotary shaft;
    a magnet stack stator mechanically coupled to said vertical rotary shaft;
    a copper winding rotor being at least partially enclosing said magnet stack stator; and
    a hydraulic energy storage apparatus coupled to said vertical rotary shaft, said hydraulic energy storage apparatus including a pelton type turbine and a hydraulic jet nozzle.

18. The vertical axis wind turbine of claim 17, further comprising a housing encasing said magnet stack stator and said copper winding rotor and wherein said plurality of wind turbine blades are attached to an exterior surface of said housing.

19. The vertical axis wind turbine of claim 17, wherein said hydraulic energy storage apparatus further comprises a turbine housing encasing said pelton type turbine and a reservoir tank disposed adjacent said turbine housing, said reservoir tank containing a pipe supplying hydraulic fluid to said pelton type turbine.

20. The vertical axis wind turbine of claim 17, further comprising a baseplate, wherein said plurality of wind turbine blades, said magnet stack stator and said copper winding rotor upstand on said baseplate.

\* \* \* \* \*